United States Patent [19]

Bertin et al.

[11] 3,916,101

[45] Oct. 28, 1975

[54] DIGITAL MULTIPHASE DIFFERENTIAL MODULATION SYSTEM

[75] Inventors: Marcel R. Bertin, Sceaux; Maurice R. Acx, Lannion, both of France

[73] Assignee: Societe Anonyme de Telecommunications, Paris, France

[22] Filed: Jan. 21, 1975

[21] Appl. No.: 542,802

[30] Foreign Application Priority Data

Jan. 30, 1974 France .............................. 74.03022

[52] U.S. Cl. .................. 178/67; 179/15 RC; 332/21

[51] Int. Cl.[2] .......................................... H04L 27/24

[58] Field of Search ................. 178/67; 325/30, 163; 332/16 R, 21; 179/15 BC

[56] References Cited

UNITED STATES PATENTS

| | | | |
|---|---|---|---|
| 3,440,346 | 4/1969 | Norby | 178/67 |
| 3,784,914 | 1/1974 | Aillet | 178/67 |

*Primary Examiner*—Albert J. Mayer

*Attorney, Agent, or Firm*—Abraham A. Saffitz

[57] ABSTRACT

A code converting system receiving at its input two sequences of synchronous binary pulses having a given recurrence rate and converting them into two further sequences of binary signals adapted to differential four-phase modulation of a high frequency carrier wave. Each of the input sequences is divided into two partial sequences respectively comprising its even and odd rank signals and which separately undergo a transcoding process delivering two new half-rate sequences. The latter sequences are interleaved to restitute signals having the same recurrence rate as the initial signals. The two so obtained interleaved sequences are applied to the modulator. The advantage of the system is that it gives each initial signal twice its own duration for its processing. The system may be generalized for its application to more than two original sequences of binary pulses and to a corresponding number of different modulation phases.

5 Claims, 7 Drawing Figures

DIGITAL MULTIPHASE DIFFERENTIAL MODULATION SYSTEM

The present invention relates to a data transmission system employing differential multiphase modulation and more particularly to a data transmission system of this type having a very high rate of the order of 1,000 Megabits per second.

In digital differential multiphase modulation systems, the phase of a frequency carrier is differentially modulated according to the various words formed by the bits of a plurality of synchronous serial data signals. Let us consider two synchronous serial data signals, the first formed by a sequence of bits A and the second by a sequence of bits B and let $A_{nT}$, $B_{nT}$ and $\phi_{nT}$ and $A_{(n-i)T}$, $B_{(n-i)T}$ and $\phi_{(n-i)T}$ be the values of the bits of the sequences A and B and of the phase $\phi$ of the carrier frequency at times $n$T and $(n-i)$T, T being the bit period and n and i being integers. Let us assume, for the time being, that $i = 1$. The frequency carrier can be written:

$$\sin(\omega t+\phi_{nT})=\bar{\alpha}_{nT}\cos\omega t-\alpha_{nT}\cos\omega t+\bar{\beta}_{nT}\sin\omega t-\beta_{nT}\sin\omega t \qquad (1)$$

which is a relationship relating $\phi_{nT}$ to $\alpha_{nT}$ and $\beta_{nT}$. Accordingly, the phase $\phi_{nT} = \pi/4$ corresponds to $\alpha=0$ and $\beta=0$, the phase $\phi_{nT} = 3\pi/4$ to $\alpha=0$ and $\beta=1$, the phase $\phi_{nT} = 5\pi/4$ to $\alpha=1$ and $\beta=1$ and the phase $\phi_{nT} = 7\pi/4$ to $\alpha=1$ and $\beta=0$.

The differential phase:

$$\Delta\phi_{nT} = \phi_{nT} - \phi_{(n-1)T} \qquad (2)$$

is related to $A_{nT}$ and $B_{nT}$ by the relationship:

$$\Delta\phi_{nT} = \bar{A}_{nT}\bar{B}_{nT}\frac{\pi}{2} + A_{nT}\bar{B}_{nT}\pi + A_{nT}B_{nT}\frac{3\pi}{2} \qquad (3)$$

Equations (1), (2) and (3) permit to establish relationships giving $\alpha_{nT}$ and $\beta_{nT}$ in function of $\alpha_{(n-1)T}$, $\beta_{(n-1)T}$, $A_{nT}$, $B_{nT}$. These relationships are the following:

$$\left.\begin{aligned}\alpha_{nT}&=\alpha_{(n-1)T}\bar{A}_{nT}B_{nT}+\bar{\beta}_{(n-1)T}\bar{A}_{nT}\bar{B}_{nT}\\&\quad+\bar{\alpha}_{(n-1)T}A_{nT}\bar{B}_{nT}+\beta_{(n-1)T}A_{nT}B_{nT}\\\beta_{nT}&=\beta_{(n-1)T}\bar{A}_{nT}B_{nT}+\alpha_{(n-1)T}\bar{A}_{nT}\bar{B}_{nT}\\&\quad+\bar{\beta}_{(n-1)T}A_{nT}\bar{B}_{nT}+\bar{\alpha}_{(n-1)T}A_{nT}B_{nT}\end{aligned}\right\} \qquad (4)$$

These relationships are equivalent to the following table giving the values of $\alpha_{nT}$ and $\beta_{nT}$ in function of $\alpha_{(n-1)T}$ and $\beta_{(n-1)T}$ for $A_{nT}B_{nT} = 00$, $A_{nT}B_{nT} = 01$, $A_{nT}B_{nT} = 10$ and $A_{nT}B_{nT} = 11$.

| | | $A_{nT}$ $B_{nT}$ = 01 | | $A_{nT}$ $B_{nT}$ = 00 | | $A_{nT}$ $B_{nT}$ = 10 | | $A_{nT}$ $B_{nT}$ = 11 | |
|---|---|---|---|---|---|---|---|---|---|
| $\alpha_{(n-1)T}$ | $\beta_{(n-1)T}$ | $\alpha_{nT}$ | $\beta_{nT}$ | $\alpha_{nT}$ | $\beta_{nT}$ | $\alpha_{nT}$ | $\beta_{nT}$ | $\alpha_{nT}$ | $\beta_{nT}$ |
| 0 | 0 | 0 | 0 | 1 | 0 | 1 | 1 | 0 | 1 |
| 1 | 0 | 1 | 0 | 1 | 1 | 0 | 1 | 0 | 0 |
| 1 | 1 | 1 | 1 | 0 | 1 | 0 | 0 | 1 | 0 |
| 0 | 1 | 0 | 1 | 0 | 0 | 1 | 0 | 1 | 1 |

The parameters $\alpha_{(n-1)T}$ and $\beta_{(n-1)T}$ at time $(n-1)$T and the bits $A_{nT}$ and $B_{nT}$ at time nT of the serial data signals are applied to a transcoder which computes the parameters $\alpha_{nT}$ and $\beta_{nT}$ at the time $n$T according to equations (4). Then, the parameters $\alpha_{nT}$ and $\beta_{nT}$ control a phase modulator.

Application of multiphase modulation to high rate serial data signals is limited by two factors. The transcoder is an iterative loop circuit which must receive the parameters it has just computed for computing the next parameters. The cycle of the transcoder is $\tau = \Delta t_1 + \Delta t_2$, $\Delta t_1$ being the time interval for computing the actual parameters from the preceding parameters and $\Delta t_2$ being the time interval for memorizing the actual parameters and applying the same to the transcoder input to allow computation of the next parameters. If the iteration for the parameters is a one bit period iteration ($i = 1$), the maximal value for $\tau$ is the bit period:

$$\Delta t_1 + \Delta t_2 \leqslant T$$

It has been proposed in U.S. Pat. No. 3,784,914 issued Jan. 8, 1974 to Claude AILLET to relate $\alpha_{nT}$ and $\beta_{nT}$ to $\alpha_{(n-2)T}$ and $\beta_{(n-2)T}$, i.e. to select a two bit period iteration ($i = 2$). In this case, one must have $$\Delta t_1 \leqslant T$$
$$\Delta t_1 + \Delta t_2 \leqslant 2T$$

the first condition expressing that the transcoder must have terminated the computation of the actual parameters when it receives the data for computing the next parameters and the second condition expressing that the iteration period is a two bit period. It results from the first condition that the bit period and its reciprocal the transmission rate is limited by the computation time.

The object of the present invention is to increase the transmission rate in the multiphase modulation systems beyond the reciprocal of the computation time of the transcoder.

According to the invention, the iteration period is taken equal to a multiple $i$ of the bit period and the transcoder comprises a number $i$ of individual transcoder units to which the incoming bits of the synchronous serial data signals are demultiplexed sequentially. The first transcoder unit receives bits $A_{(n-i)T}$, $A_{nT}$, . . . , $B_{(n-i)T}$, $B_{nT}$, . . . and forms $\alpha_{nT}$ and $\beta_{nT}$ from $\alpha_{(n-i)T}$, $\beta_{(n-i)T}$, $A_{nT}$ and $B_{nT}$. The second transcoder unit receives bits $A_{(n-i+1)T}$, $A_{(n+1)T}$, . . . , $B_{(n-i+1)T}$, $B_{(n+1)T}$, . . . and forms $\alpha_{(n+1)T}$ and $\beta_{(n+1)T}$ from $\alpha_{(n-i+1)T}$, $\beta_{(n-i+1)T}$, $A_{(n+1)T}$ and $B_{(n+1)T}$. The $i^{th}$ transcoder unit receives bits $A_{(n-1)T}$, $A_{n+i-1)T}$, . . . , $B_{(n-1)T}$, $B_{(n+i-1)T}$ and forms $\alpha_{(n+i-1)T}$, $\beta_{(n+i-1)T}$ from $\alpha_{(n-1)T}$, $\beta_{(n-1)T}$, $A_{(n+i-1)}$ and $B_{(n+i-1)T}$.

In the case of a differential phase shift incremented from $i$ bits to $i$ bits, equations (4) become:

$$\left.\begin{aligned}\alpha_{nT}&=\alpha_{(n-i)T}\bar{A}_{nT}B_{nT}+\bar{\beta}_{(n-i)T}\bar{A}_{nT}\bar{B}_{nT}\\&\quad+\bar{\alpha}_{(n-i)T}A_{nT}\bar{B}_{nT}+\beta_{(n-i)T}A_{nT}B_{nT}\\\beta_{nT}&=\beta_{(n-i)T}\bar{A}_{nT}B_{nT}+\alpha_{(n-i)T}\bar{A}_{nT}\bar{B}_{nT}\\&\quad+\bar{\beta}_{(n-i)T}A_{nT}\bar{B}_{nT}+\bar{\alpha}_{(n-i)T}A_{nT}B_{nT}\end{aligned}\right\} \qquad (5)$$

Embodiments of the invention employing sets for four and eight phase modulation will be explained as examples referring to the accompanying drawings in which.

Figure 1:
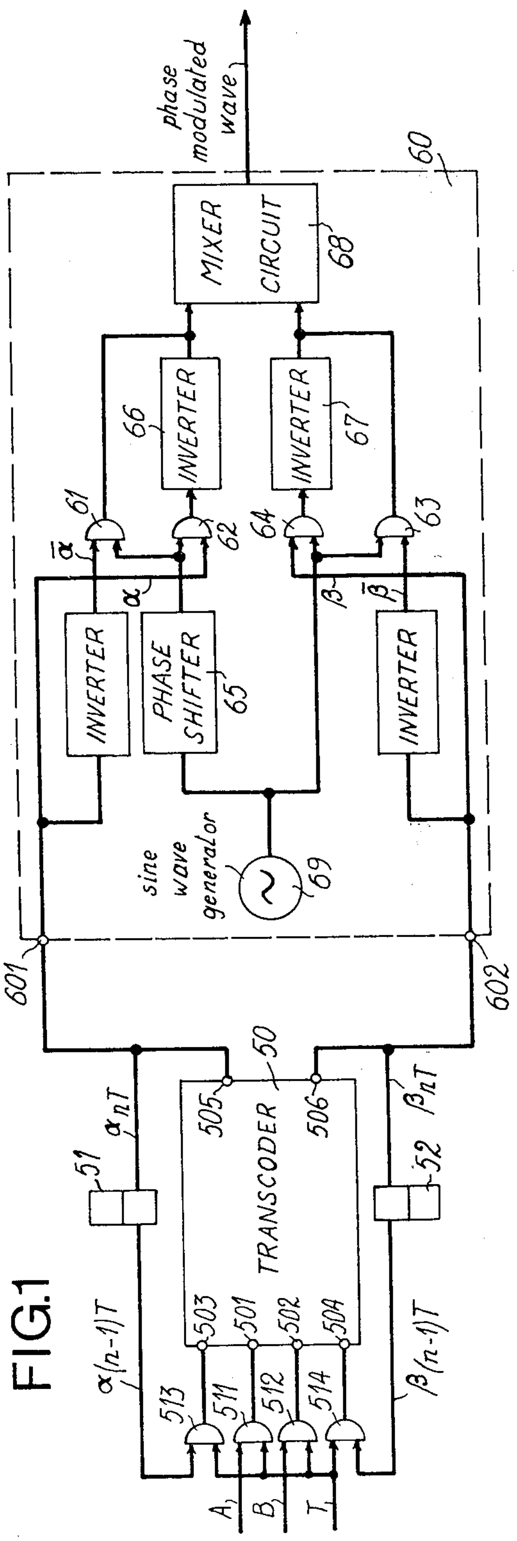
FIG. 1 is a block diagram of a multiphase modulation data transmission system according to the prior art.

Referring now to FIG. 1, reference numeral 50 designates a transcoder receiving at its input terminals 501 and 502 two synchronous serial binary data signals A and B and transmitting at its output terminals 505 and 506 two digital parameters $\alpha$ and $\beta$. Timing pulses T at the rate of the serial binary data signals are applied to AND gates 511 to 514, thereby entering into transcoder 50 the bits $A_{nT}$ and $B_{nT}$ through inputs 501 and 502 and the parameters $\alpha_{(n-1)T}$ and $\beta_{(n-1)T}$ through inputs 503 and 504, these parameters being stored respectively in flipflops 51 and 52.

Reference numeral 60 designates a phase modulator and reference numeral 69 designates an ultra high frequency oscillator having for example an oscillation frequency of 1,450 MHz, connected to analog gates 61–64, respectively through a 90° phase shifter 65 and directly. Analog gates 61 and 62 are controlled respectively by parameters $\bar{\alpha}$ and $\alpha$ and analog gates 63 and 64 are controlled respectively by parameters $\bar{\beta}$ and $\beta$. The outputs of gates 62 and 64 are connected to inverters 66 and 67 and the outputs of gates 61 and 63 and inverters 66 and 67 are connected to a mixer circuit 68. The output of mixer circuit 68 is connected to an ultra high frequency channel not represented, for instance a waveguide.

It clearly appears to those skilled in the art that the signal produced by the multiphase modulator of FIG. 1 is given by expression (1).

Figure 2:
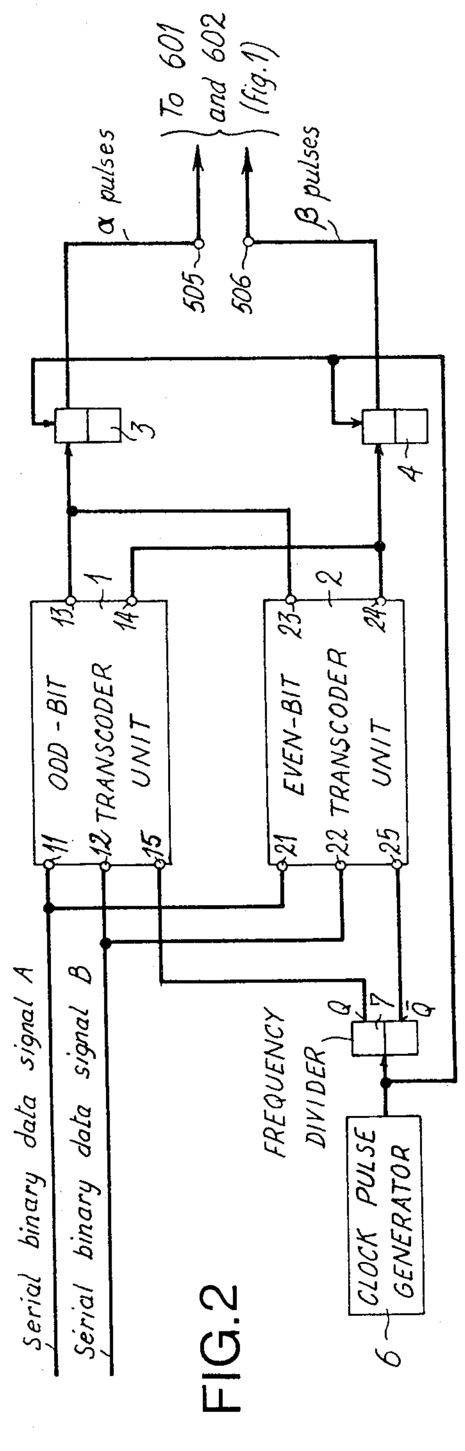
FIG. 2 represents in block diagram form a transcoder for fourphase modulation data transmission system according to the invention in which the bits of the serial binary data signals are dimultiplexed in two channels and the differential phase shift is incremented every two bits in each channel.

Referring now to FIG. 2, reference numerals 1 and 2 designate two transcoders units, the first processing the odd bits $A_{(2n-1)T}$, $A_{(2n+1)T}$, . . . , $B_{(2n-1)T}$, $B_{(2n+1)T}$ of serial binary data signals A and B and the second 2 processing the even bits $A_{2(n-1)T}$, $A_{2nT}$, . . . , $B_{2(n-1)T}$, $B_{2nT}$, . . . of these signals. The serial binary data signals A and B are applied respectively to input terminals 11 and 12 of transcoder unit 1 and input terminals 21 and 22 of transcoder unit 2.

Clock pulses T at the rate of data signals A and B produced by clock pulse generator 6 are applied to frequency divider 7 which produces 180° phase-shifted clock pulses at half the rate of the incoming clock pulses T. Output terminals $\bar{Q}$ and Q of frequency divider 7 are connected respectively to input terminals 15 of transcoder unit 1 and 25 of transcoder unit 2.

Output terminals 13 and 23 of transcoder-units 1 and 2 are connected together to the input of a first D-type flipflop 3 and output terminals 14 and 24 of these transcoders are connected together to the input of a second D-type flipflop 4. The clock terminals of flipflops 3 and 4 are controlled by clock pulse generator 6. Output terminals 505 and 506 of flipflops 3 and 4 respectively deliver the $\alpha$ and $\beta$ signals and are respectively connected to terminals 601 and 602 of the phase-modulator 60 of FIG. 1.

Odd bit transcoder unit 1 and even bit transcoder unit 2 are identical and only the first of them will be described in relation to FIG. 3.

Figure 3:
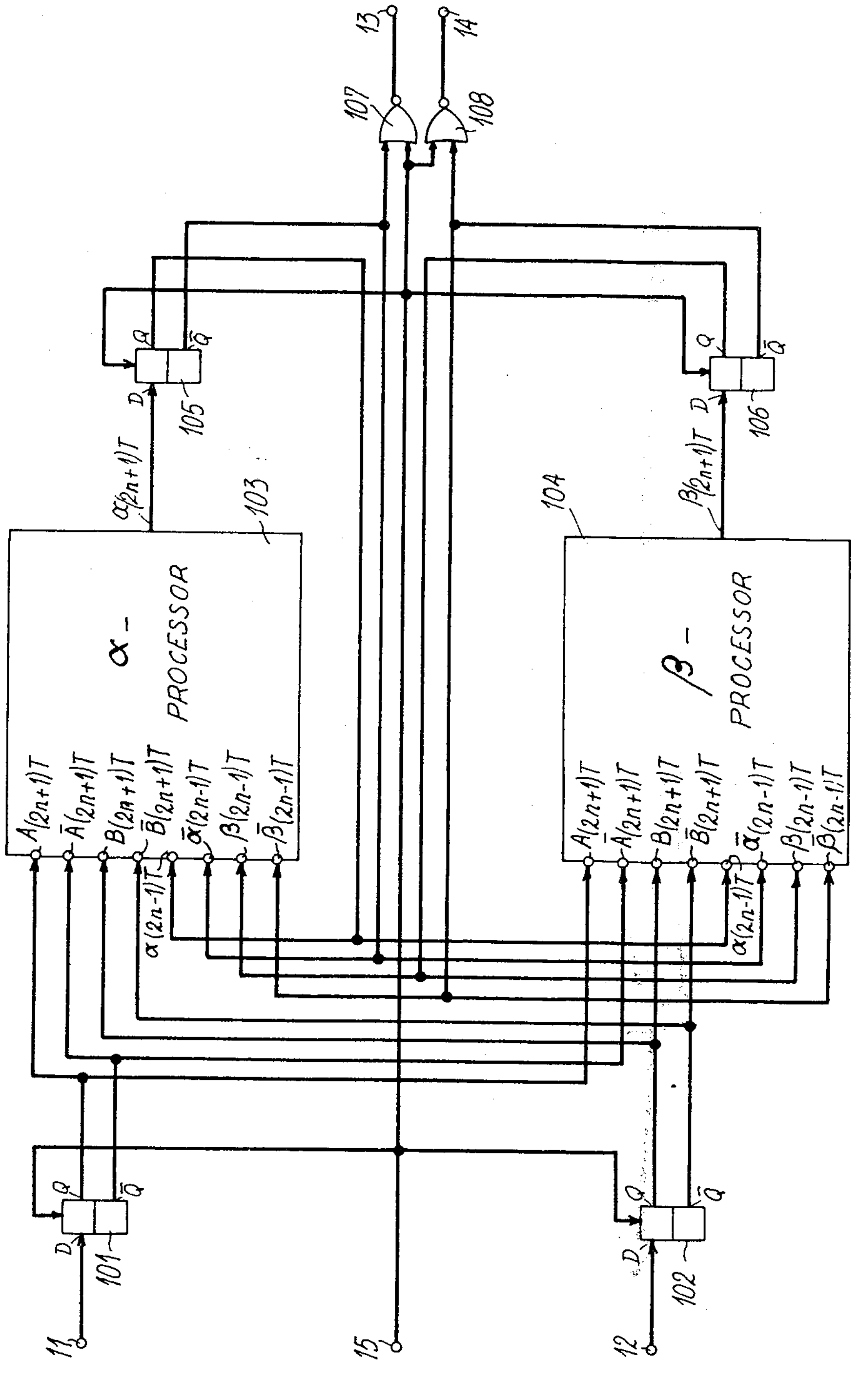
FIG. 3 is a detailed diagram of one of the two transcoder units of FIG. 2, each of said units including two processors.

Referring now to FIG. 3, input terminals 11 and 12 are respectively connected to D-type flipflops 101 and 102 which also receive through terminal 15 the half rate clock pulses produced by frequency divider 7. At the outputs Q and $\bar{Q}$ of flipflop 101 there appear the odd bits $A_{(2n+1)T}$ and $\bar{A}_{(2n+1)T}$ of signal A and at the output Q and $\bar{Q}$ of flipflop 102 there appear the odd bits $B_{(2n+1)T}$ and $\bar{B}_{(2n+1)T}$ of signal B. These outputs are connected to both $\alpha$-processor 103 and $\beta$-processor 104. The outputs of processors 103 and 104 are connected to D-type flipflops 105 and 106 which also receive the half rate clock pulses produced by frequency divider 7. The output of flipflops 105 and 106 which supply the signals $\alpha_{(2n-1)T}$, $\bar{\alpha}_{(2n-1)T}$, $\alpha_{(2n+1)T}$, $\bar{\alpha}_{(2n+1)T}$, . . . , $\beta_{(2n-1)T}$, $\bar{\beta}_{(2n-1)T}$, $\beta_{(2n+1)T}$, $\bar{\beta}_{(2n+1)T}$, . . . are connected to both processors 103 and 104.

$\alpha$-processor 103 and $\beta$-processor 104 implement respectively the operations given by the first and second equations (5) in the case where $n$ is odd and $i = 2$, that is:

$$\left.\begin{aligned}\alpha_{(2n+1)T} &= \alpha_{(2n-1)T}\bar{A}_{(2n+1)T}B_{(2n+1)T}+\bar{\beta}_{(2n-1)T}\bar{A}_{(2n+1)T}\bar{B}_{(2n+1)T}\\&+\bar{\alpha}_{(2n-1)T}A_{(2n+1)T}\bar{B}_{(2n+1)T}+\beta_{(2n-1)T}A_{(2n+1)T}B_{(2n+1)T}\\\beta_{(2n+1)T} &= \beta_{(2n-1)T}\bar{A}_{(2n+1)T}B_{(2n+1)T}+\alpha_{(2n-1)T}\bar{A}_{(2n+1)T}\bar{B}_{(2n+1)T}\\&+\bar{\beta}_{(2n-1)T}A_{(2n+1)T}\bar{B}_{(2n+1)T}+\bar{\alpha}_{(2n-1)T}A_{(2n-1)T}B_{(2n+1)T}\end{aligned}\right\} \quad (6)$$

Figure 4:
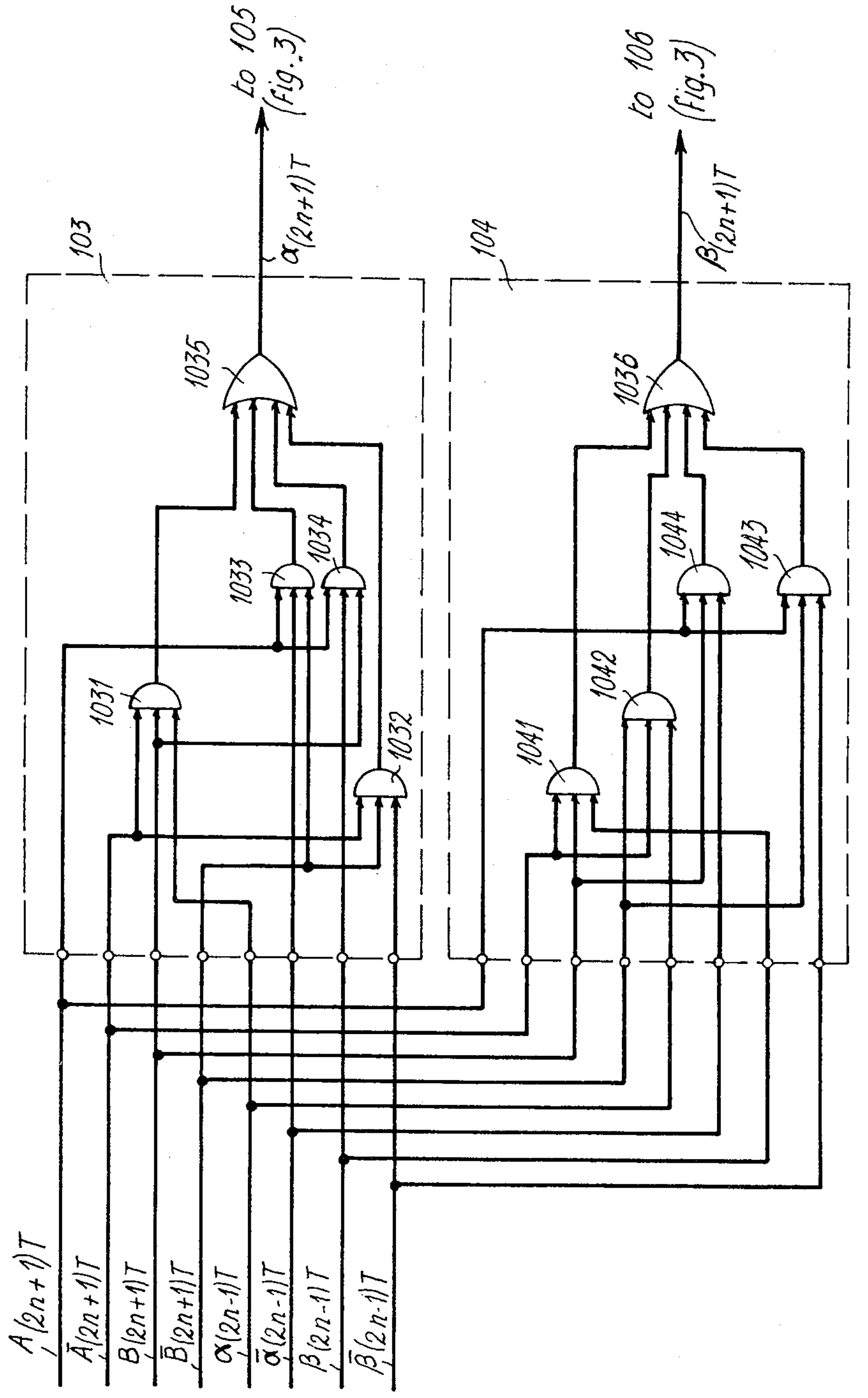
FIG. 4 represents in detail one of the processors included in the transcoder of FIG. 3.

Referring now to FIG. 4, each of the processors comprises four AND-gates, respectively 1031 to 1034 and 1041 to 1044, implementing the products of the second number of equations (6) and an OR-gate, respectively 1035 and 1036, implementing the sum of the products.

The outputs $\bar{Q}$ of flipflops 105 and 106 (FIG. 3) are respectively connected to the inputs of NOR gates 107 and 108 which also receive the half rate timing pulses from 7 (FIG. 2) through terminal 15 (FIGS. 2 and 3). The outputs of NOR gates 107 and 108 (FIG. 3) are the output terminals 13 and 14 of the odd-bit transcoder 1 (FIG. 2).

Even-bit transcoder 2 is quite similar to odd-bit transcoder 1 with the exception that it is timed by timing pulses received at 25 from frequency divider 7 in phase opposition to those supplied at 15 to transcoder 1, as shown in FIG. 2.

Figure 5:
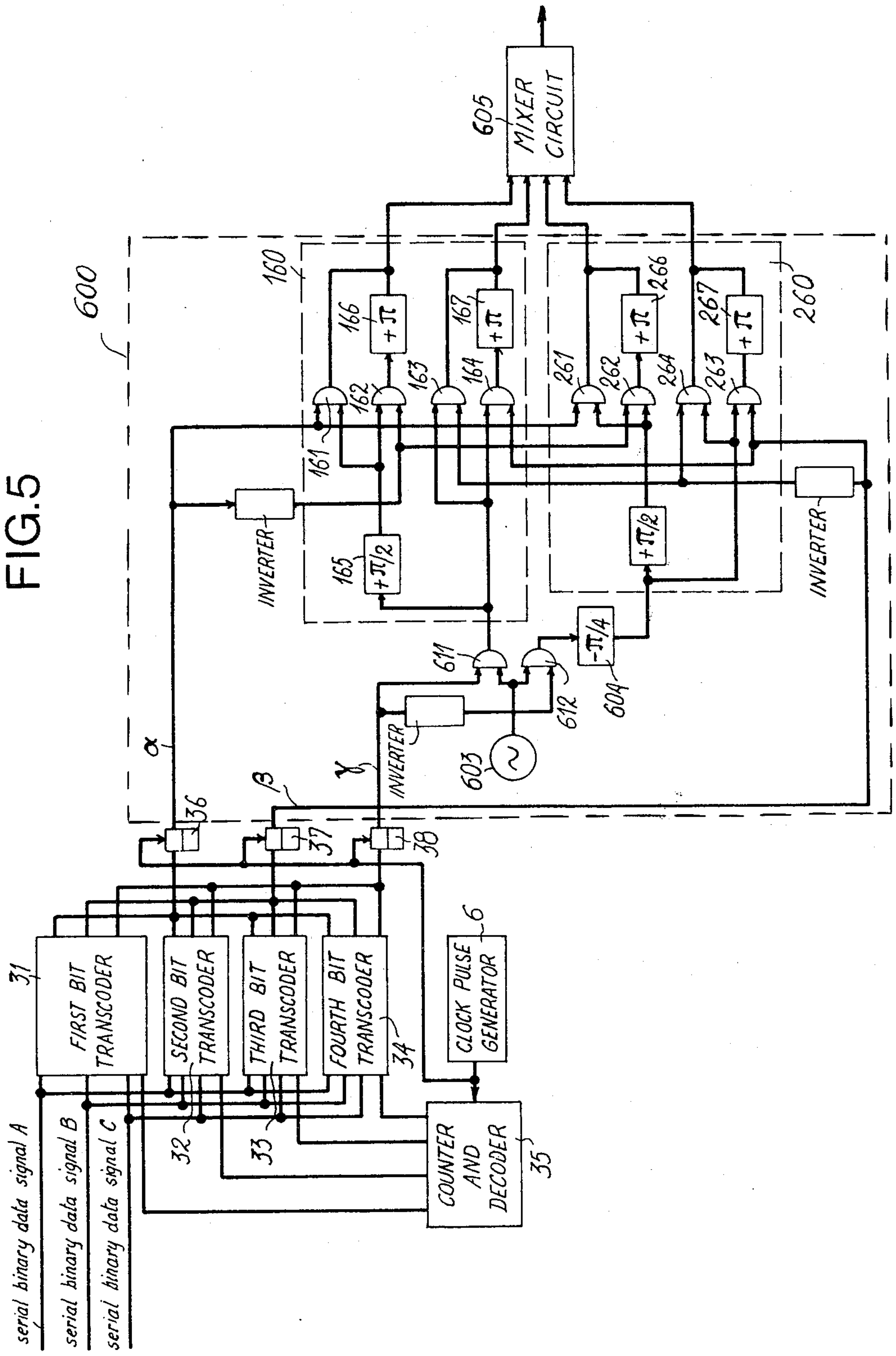
FIG. 5 represents in block diagram form a transcoder for eight-phase modulation data transmission system according to the invention in which the bits of the serial binary data signals are demultiplexed in four channels and the differential phase-shift is incremented every four bits in each channel.
Figure 6:
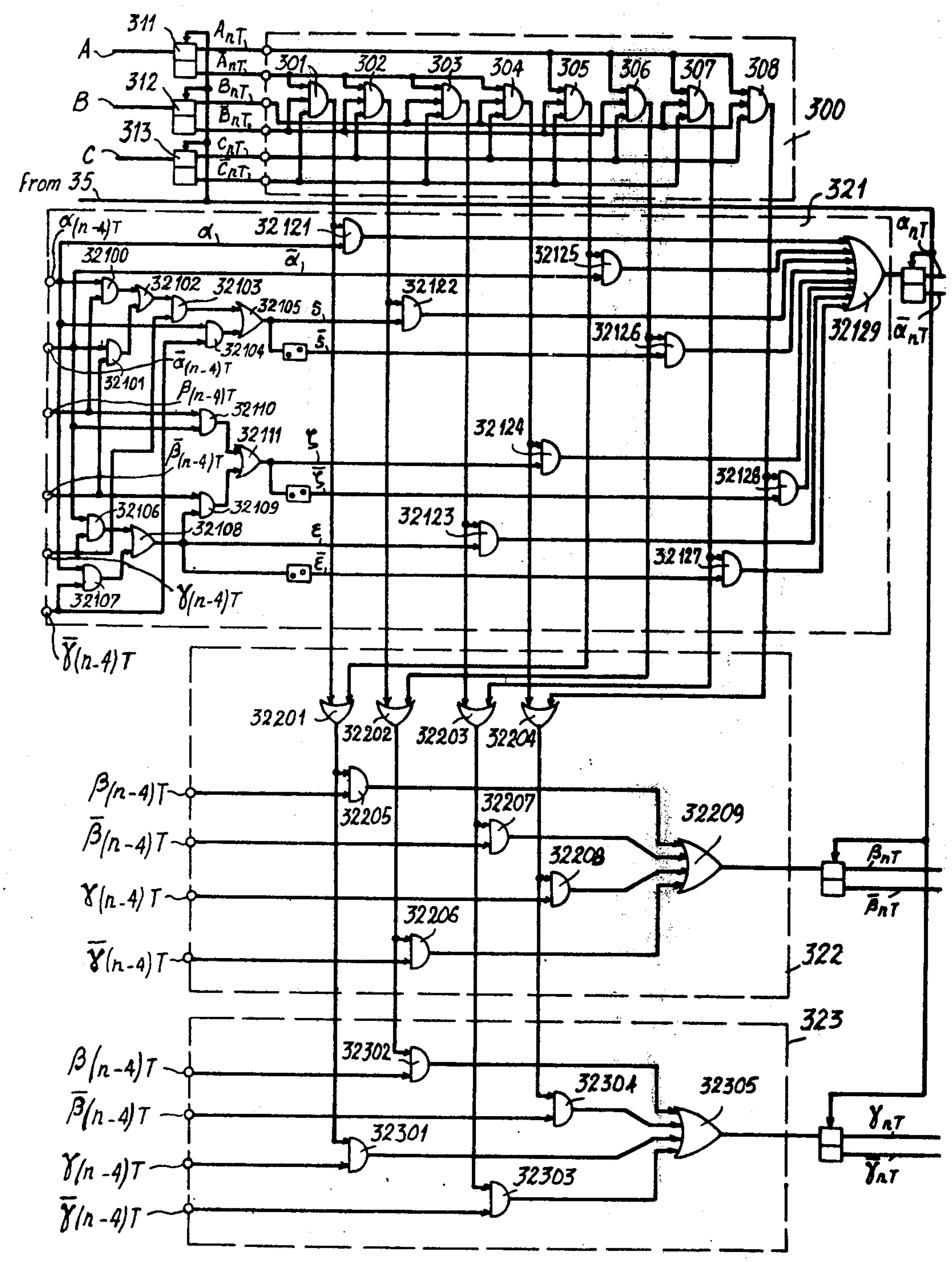
FIG. 6 represents in detail one of the processors included in one of the transcoders of FIG. 5.

Turning to FIGS. 5 and 6, it is now assumed that there are three serial binary data signals, A, B and C, and that iteration takes place every four bits.

The frequency carrier can be written $$\left.\begin{aligned}\sin(\omega t+\phi_{nT}) &= \bar{\gamma}[\bar{\alpha}_{nT}\cos\omega t-\alpha_{nT}\cos\omega t+\bar{\beta}_{nT}\sin\omega t-\beta_{nT}\sin\omega t]\\&+\gamma[\bar{\alpha}_{nT}(\cos\omega t-\pi/4)-\alpha_{nT}\cos(\omega t-\pi/4)\\&\qquad+\bar{\beta}_{nT}\sin(\omega t-\pi/4)-\beta_{nT}\sin(\omega t-\pi/4)]\end{aligned}\right\} \quad (1')$$

Figure 7:
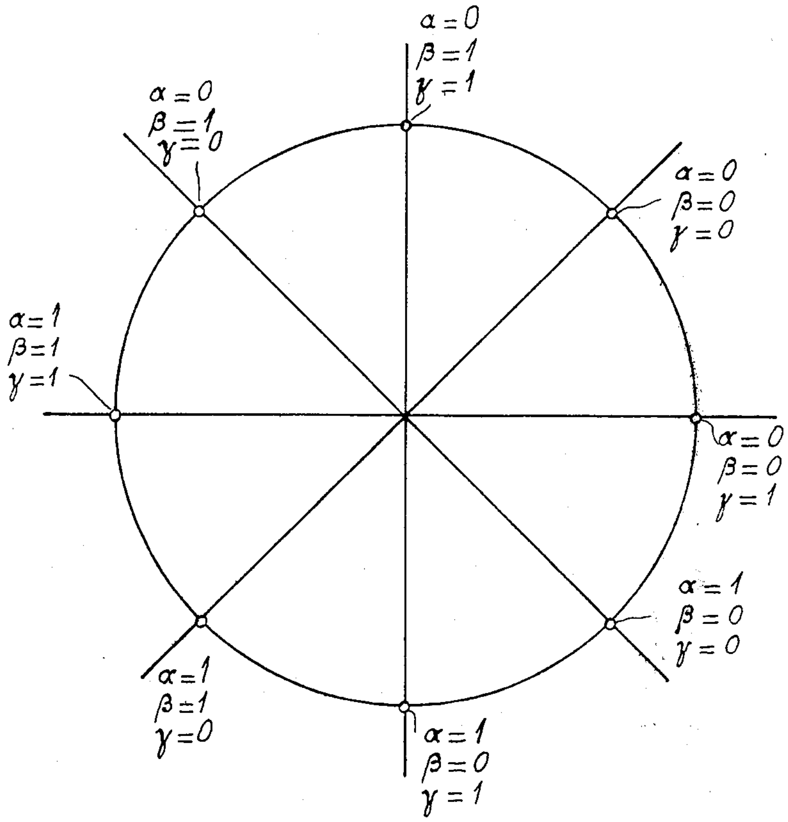
FIG. 7 is a phase diagram of explaining the operation of a multiphase differential modulation system.

When $\gamma=1$, the resultant phases are given by the first bracketed quantity which is the same as in equation (1). Accordingly, the phase is equal to $\pi/4$, $3\pi/4$, $5\pi/4$ or $7\pi/4$ in function of the values of $\alpha$ and $\beta$ (see FIG. 7).

When $\bar{\gamma}=1$, the phases are given by the second bracketed quantity which is the same as in equation (1)

with the exception that all the component phases are decremented by $\pi/4$. Accordingly the phase is equal to 0, $\pi/2$, $\pi$, $3\pi/2$ in function of the values of $\alpha$ and $\beta$ (see FIG. 7).

The differential phase is related to the bits of signals A, B and C by the relationship $$\left.\begin{aligned}\Delta\phi_{nT} = & A_{nT}B_{nT}\overline{C}_{nT}\frac{\pi}{4} + A_{nT}\overline{B}_{nT}\overline{C}_{nT}\frac{\pi}{2} + A_{nT}\overline{B}_{nT}\overline{C}_{nT}\frac{3\pi}{4} \\ & + \overline{A}_{nT}B_{nT}C_{nT}\pi + \overline{A}_{nT}B_{nT}\overline{C}_{nT}\frac{5\pi}{4} + \overline{A}_{nT}\overline{B}_{nT}C_{nT}\frac{3\pi}{2} \\ & + \overline{A}_{nT}\overline{B}_{nT}\overline{C}_{nT}\frac{7\pi}{4}\end{aligned}\right\} \quad (3')$$

Equations (1'), (2) and (3') permit to establish relationships giving $\alpha_{nT}$, $\beta_{nT}$ and $\gamma_{nT}$ in function of $\alpha_{(n-4)T}$, $\beta_{(n-4)T}$, $\gamma_{(n-4)T}$, $A_{nT}$, $B_{nT}$, $C_{nT}$. These relationships are the following:

$$\left.\begin{aligned}\alpha_{nT} = & \alpha_{n-4)T}\overline{A}_{nT}\overline{B}_{nT}\overline{C}_{nT} + \delta_{(n-4)T}\overline{A}_{nT}\overline{B}_{nT}C_{nT} + \epsilon_{(n-4)T}\overline{A}_{nT}B_{nT}\overline{C}_{nT} \\ & + \zeta_{(n-4)T}\overline{A}_{nT}B_{nT}C_{nT} + \overline{\alpha}_{(n-4)T}A_{nT}\overline{B}_{nT}\overline{C}_{nT} + \overline{\delta}_{(n-4)T}A_{nT}\overline{B}_{nT}C_{nT} \\ & + \overline{\epsilon}_{(n-4)T}A_{nT}B_{nT}\overline{C}_{nT} + \overline{\zeta}_{(n-4)T}A_{nT}B_{nT}C_{nT}\end{aligned}\right\} \quad (7)$$

$$\begin{aligned}\beta_{nT} = & \beta_{(n-4)T}[\overline{A}_{nT}\overline{B}_{nT}\overline{C}_{nT} + A_{nT}\overline{B}_{nT}\overline{C}_{nT}] \\ & \pm \overline{\gamma}_{(n-4)T}[\overline{A}_{nT}\overline{B}_{nT}C_{nT} + A_{nT}\overline{B}_{nT}C_{nT}] \\ & \overline{\beta}_{(n-4)T}[\overline{A}_{nT}B_{nT}\overline{C}_{nT} + A_{nT}B_{nT}\overline{C}_{nT}] \\ & + \gamma_{(n-4)T}[\overline{A}_{nT}B_{nT}C_{nT} + A_{nT}B_{nT}C_{nT}] \\ \gamma_{nT} = & \gamma_{(n-4)T}[\overline{A}_{nT}\overline{B}_{nT}\overline{C}_{nT} + A_{nT}\overline{B}_{nT}\overline{C}_{nT}] \\ & + \beta_{(n-4)T}[\overline{A}_{nT}\overline{B}_{nT}C_{nT} + A_{nT}\overline{B}_{nT}C_{nT}] \\ & + \overline{\gamma}_{(n-4)T}[\overline{A}_{nT}B_{nT}\overline{C}_{nT} + A_{nT}B_{nT}\overline{C}_{nT}] \\ & + \overline{\beta}_{(n-4)T}[\overline{A}_{nT}B_{nT}C_{nT} + A_{nT}B_{nT}C_{nt}]\end{aligned}$$

where $$\delta = \gamma(\alpha\beta + \overline{\alpha}\,\overline{\beta}) + \alpha\overline{\gamma}$$

$$\epsilon = \overline{\alpha}\gamma + \alpha\overline{\gamma}$$

$$\zeta = \overline{\beta}[\overline{\alpha}\gamma + \alpha\overline{\gamma}] + \overline{\alpha}\beta = \overline{\beta}\epsilon + \overline{\alpha}\beta$$

These relationships are equivalent to the following table giving the values of $\alpha_{nT}$, $\beta_{nT}$ and $\gamma_{nT}$ in function of $\alpha_{(n-4)T}$, $\beta_{(n-4)T}$ and $\gamma_{(n-4)T}$ for $A_{nT}\,B_{nT}\,C_{nT}$ = 000, 001, 010, 011, 100, 101, 110, 111.

gates 611 and 612 respectively controlled by signals $\gamma$ and $\gamma$. A $\pi/4$ phase shifter 604 is inserted at the output of AND gate 612.

The three serial data signals A, B and C are applied in parallel to first bit transcoder 31, second bit transcoder 32, third bit transcoder 33 and fourth bit transcoder 34. Clock pulse generator 6 produces timing pulses T at the rate of the synchronous serial information signals and these pulses are applied to a counter and decoder 35 acting as a frequency divider by 4. The output pulses available on the four terminals of counter and decoder 35 form four interlaced sequences having a recurrence frequency four times smaller than that of timing pulses T and these pulse sequences are respectively applied to transcoders 31, 32, 33, 34 for operating the same in time-division. The transcoder 31–34 each forms the signal $\alpha$, $\beta$ and $\gamma$ at instant nT from the information signals A, B and C at the same instant and the $\alpha$, $\beta$ and $\gamma$ signals at instant $(n-4)$T. The output signals $\alpha$, $\beta$ and $\gamma$ are timed by flipflops 36, 37, 38 controlled by clock pulse generator 6.

In FIG. 6, the first digit transcoder 31 is represented in detail. It comprises three input flipflops 311, 312 and 313 which receive the information signals A, B and C and are timed by the counter and decoder 35. These flipflops are connected to general processor 300. This processor receives the bits $A_{nT}$, $B_{nT}$, $C_{nT}$ and comprises eight AND-gates 301 to 308 forming the products $\overline{A}_{nT}\,\overline{B}_{nT}\,\overline{C}_{nT}$, $\overline{A}_{nT}\,\overline{B}_{nT}\,C_{nT}$, $\overline{A}_{nT}\,B_{nT}\,C_{nT}$, $\overline{A}_{nT}\,B_{nT}\,C_{nT}$, $A_{nT}\,\overline{B}_{nT}\,\overline{C}_{nT}$, $A_{nT}\,\overline{B}_{nT}\,C_{nT}$, $A_{nT}\,\overline{B}_{nT}\,C_{nT}$, $A_{nT}\,B_{nT}\,C_{nT}$. The outputs of these AND-gates are connected in parallel to $\alpha$-processor 321 and $\beta$-processor 322. Processors 321–323 receive parameters $\alpha_{(n-4)T}$, $\beta_{(n-4)T}$, $\gamma_{(n-4)T}$.

In $\alpha$-processor 321, gates 32100 to 32105 serve to form $\delta$, gates 32106 to 32108 serve to form $\epsilon$ and gates 32109 to 32111 serve to form $\zeta$. AND-gates 32121 to 32128 receive respectively the output signals of gates

| | | | $A_{nT}B_{nT}C_{nT}$ = 000 | | | $A_{nT}B_{nT}C_{nT}$ = 001 | | | $A_{nT}B_{nT}C_{nT}$ = 010 | | | $A_{nT}B_{nT}C_{nT}$ = 011 | | |
|---|---|---|---|---|---|---|---|---|---|---|---|---|---|---|
| $\alpha_{(n-4)T}$ | $\beta_{(n-4)T}$ | $\gamma_{(n-4)T}$ | $\alpha_{nT}$ | $\beta_{nT}$ | $\gamma_{nT}$ | $\alpha_{nT}$ | $\beta_{nT}$ | $\gamma_{nT}$ | $\alpha_{nT}$ | $\beta_{nT}$ | $\gamma_{nT}$ | $\alpha_{nT}$ | $\beta_{nT}$ | $\gamma_{nT}$ |
| 0 | 0 | 0 | 0 | 0 | 0 | 0 | 1 | 0 | 0 | 1 | 1 | 0 | 0 | 1 |
| 0 | 1 | 0 | 0 | 1 | 0 | 0 | 1 | 1 | 0 | 0 | 1 | 1 | 0 | 0 |
| 0 | 1 | 1 | 0 | 1 | 1 | 0 | 0 | 1 | 1 | 0 | 0 | 1 | 1 | 0 |
| 0 | 0 | 1 | 0 | 0 | 1 | 1 | 0 | 0 | 1 | 1 | 0 | 1 | 1 | 1 |
| 1 | 0 | 0 | 1 | 0 | 0 | 1 | 1 | 0 | 1 | 1 | 1 | 1 | 0 | 1 |
| 1 | 1 | 0 | 1 | 1 | 0 | 1 | 1 | 1 | 1 | 0 | 1 | 0 | 0 | 0 |
| 1 | 1 | 1 | 1 | 1 | 1 | 1 | 0 | 1 | 0 | 0 | 0 | 0 | 1 | 0 |
| 1 | 0 | 1 | 1 | 0 | 1 | 0 | 0 | 0 | 0 | 1 | 0 | 0 | 1 | 1 |

| | | | $A_{nT}B_{nT}C_{nT}$ = 1C0 | | | $A_{nT}B_{nT}C_{nT}$ = 101 | | | $A_{nT}B_{nT}C_{nT}$ = 110 | | | $A_{nT}B_{nT}C_{nT}$ = 111 | | |
|---|---|---|---|---|---|---|---|---|---|---|---|---|---|---|
| $\alpha_{(n]4)T}$ | $\beta_{(n-4)T}$ | $\gamma_{(n-4)T}$ | $\alpha_{nT}$ | $\beta_{nT}$ | $\gamma_{nT}$ | $\alpha_{nT}$ | $\beta_{nT}$ | $\gamma_{nT}$ | $\alpha_{nT}$ | $\beta_{nT}$ | $\gamma_{nT}$ | $\alpha_{nT}$ | $\beta_{nT}$ | $\gamma_{nT}$ |
| 0 | 0 | 0 | 1 | 0 | 0 | 1 | 1 | 0 | 1 | 1 | 1 | 1 | 0 | 1 |
| 0 | 1 | 0 | 1 | 1 | 0 | 1 | 1 | 1 | 1 | 0 | 1 | 0 | 0 | 0 |
| 0 | 1 | 1 | 1 | 1 | 1 | 1 | 0 | 1 | 0 | 0 | 0 | 0 | 1 | 0 |
| 0 | 0 | 1 | 1 | 0 | 1 | 0 | 0 | 0 | 0 | 1 | 0 | 0 | 1 | 1 |
| 1 | 0 | 0 | 0 | 0 | 0 | 0 | 1 | 0 | 0 | 1 | 1 | 0 | 0 | 1 |
| 1 | 1 | 0 | 0 | 1 | 0 | 0 | 1 | 1 | 0 | 0 | 1 | 1 | 0 | 0 |
| 1 | 1 | 1 | 0 | 1 | 1 | 0 | 0 | 1 | 1 | 0 | 0 | 1 | 1 | 0 |
| 1 | 0 | 1 | 0 | 0 | 1 | 1 | 0 | 0 | 1 | 1 | 0 | 1 | 1 | 1 |

In FIG. 5, the phase modulator unit 600 comprises a sine wave generator 603 and two four-phase modulators 160 and 260 identical to four-phase modulator 60 of FIG. 1. The components of the four-phase modulators 160 and 260 are given the same reference numerals as in modulator 60 of FIG. 1, with respectively a hundred additional digit which is 1 for modulator 160 and 2 for modulator 260. The two four-phase modulators 160 and 260 are controlled through two AND

301 to 308 and the signals $\alpha$, $\delta$, $\epsilon$, $\zeta$ and $\overline{\alpha}$, $\overline{\delta}$, $\overline{\epsilon}$, $\overline{\zeta}$. OR-gate 32129 implements the addition of the outputs of gates 32121 to 32128.

In $\beta$-processor 322, OR-gates 32201 to 32204 implement the bracketed sums of the second of equations (6); gates 32205 to 32208 implement the products expressed in said equation and OR-gate 32209 implements the addition of the outputs of gates 32205 to 32208.

In γ-processor 323, gates 32301 to 32304, connected to the outputs of gates 32201 to 32204 implement the products expressed in the third of equations (6) and OR-gate 32205 implements the additions of the outputs of gates 32301 to 32304.

What we claim is:

1. A phase modulator for modulating a carrier frequency wave according to a multiplicity of digital phase values comprising: a sine wave generator;

phase shifting means for imparting at a given bit period to said sine wave a given phase selected among a plurality of $2^p$ phase values, each defined by a parallel word formed of p binary parameters;

means for receiving a plurality of $p$ synchronous input serial data signals, each formed of recurrent bits having said given bit period;

means for time demultiplexing the bits included in group of n successive bits of the input serial data signals and forming a first parallel binary word with the first bits, a second parallel binary word with the second bits and a $n^{th}$ parallel binary word with the $n^{th}$ bits of the groups of all the serial input data signals, said binary words having a word period equal to n times the bit period and defining phase increments:

a plurality of n transcoding means respectively receiving said phase increment defining binary word at a present word period and said phase value defining binary parameters at the preceding word period and forming therefrom phase value defining binary parameters at said present word period; and means for time-multiplexing said phase value defining binary parameters at said present word period formed by said plurality of transcoding means and controlling therewith said phase shifting means.

2. A phase modulator according to claim 1, in which the number p of phase value defining, binary parameters and of input serial data signals, is equal to 2, the plurality $2^p$ of phase values is 0°, 90°, 180°, 270° and the number $n$ of bits in the groups of bits of the input serial data signals is equal to 2.

3. A phase modulator according to claim 1, in which the number $p$ of phase value defining, binary parameters and of input serial data signals, is equal to 3, the plurality $2^p$ of phase values is 0°, 45°, 90°, 135°, 180°, 225°,270°, 315°; and the number $n$ of bits in the groups of bits of the input serial data signals is equal to 4.

4. A phase modulator for modulating a carrier frequency wave according to a multiplicity of digital phase values comprising: a sine wave generator;

phase-shifting means including two phase-shifting units each comprising two first gating means controlled by a first binary parameter signal according to the value thereof and receiving respectively the input sine wave produced by said sine wave generator and said input sine wave phase-shifted by 180° and two second gating means controlled by a second binary parameter signal according to the value thereof and receiving respectively said input sine wave phase-shifted by 90° and 270°;

means for receiving two synchronous input serial data signals, each formed of recurrent bits having a given bit period;

means for time-demultiplexing the bits included in group of $n$ successive bits of the input serial data signals and forming a first two-bit word with the first bits, a second two-bit word with the second bits and a $n^{th}$ two-bit word with the $n^{th}$ bits of the groups of all the serial input data signals, said binary words having a word period equal to $n$ times the bit period and defining phase increments;

a plurality of $n$ transcoding means respectively receiving said phase increment defining binary word at a present word period and said phase value defining binary parameters at the preceding word period and forming therefrom phase value defining binary parameters at said present word period; and means for time-multiplexing said phase value defining, binary parameters at said present word period formed by said plurality of transcoding means, thereby forming the first and second binary parameter signals and controlling therewith said first and second gating means.

5. A phase modulator for modulating a carrier frequency wave according to a multiplicity of digital phase values comprising: a sine wave generator;

phase-shifting means including two phase-shifting units each comprising two first gating means controlled by a first binary parameter signal according to the value thereof and receiving respectively an input sine wave and said input sine wave phase-shifted by 180°, two second gating means controlled by a second binary parameter signal according to the value thereof and receiving respectively said input sine wave phase-shifted by 90° and 270°, an additional phase shifting unit comprising two third gating means controlled by a third binary parameter signal according to the value thereof and connected to the sine wave generator and means for selectively applying said generator sine wave and said generator sine wave phase-shifted by a predetermined angle as input sine waves to respectively said two phase-shifting units;

means for receiving three synchronous input serial data signals, each formed of recurrent bits having a given bit period;

means for time-demultiplexing the bits included in group of $n$ successive bits of the input serial data signals and forming a first three-bit word with the first bits, a second three-bit word with the second bits and a $n^{th}$ three-bit word with the $n^{th}$ bits of the groups of all the serial input data signals, said binary words having a word period equal to n times the bit period andd defining phase increments;

a plurality of n transcoding means respectively receiving said phase increment defining binary word at a present word period and said phase value defining binary parameters at the preceding word peeriod and forming therefrom phase value defining binary parameters at said present word period; and means for time-multiplexing said phase value defining, binary parameters at said present word period formed by said plurality of transcoding means, thereby forming the first, second and third binary parameter signals and controlling therewith said first, second and additional gating means.

* * * * *